(12) United States Patent
Amagai et al.

(10) Patent No.: US 6,714,757 B2
(45) Date of Patent: Mar. 30, 2004

(54) IMAGE READING APPARATUS AND AN IMAGE FORMING APPARATUS HAVING THE IMAGE READING APPARATUS

(75) Inventors: Yoshihide Amagai, Ibaraki (JP); Tomonori Kitan, Chiba (JP); Kenichi Yukinari, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/172,011

(22) Filed: Jun. 17, 2002

(65) Prior Publication Data

US 2003/0002897 A1 Jan. 2, 2003

(30) Foreign Application Priority Data

Jun. 27, 2001 (JP) ........................................ 2001-195288
Nov. 7, 2001 (JP) ........................................ 2001-342271

(51) Int. Cl.[7] .............................................. G03G 15/00
(52) U.S. Cl. ........................................ 399/365; 399/367
(58) Field of Search ................................ 399/365, 367, 399/377, 379, 380, 17, 82; 358/474, 496, 497, 494

(56) References Cited

U.S. PATENT DOCUMENTS 5,077,585 A * 12/1991 Watanabe et al. ........... 399/367
5,878,319 A * 3/1999 Itoh ............................ 399/367
5,881,350 A * 3/1999 Wada et al. .................. 399/367
5,881,351 A * 3/1999 Shimotoso et al. .......... 399/377
6,256,473 B1 * 7/2001 Kamanuma et al. ........ 399/367

FOREIGN PATENT DOCUMENTS

| JP | 11-136437 | * | 5/1999 |
| JP | 11-239247 | * | 8/1999 |
| JP | 2000-181152 | * | 6/2000 |
| JP | 2001-358907 | * | 12/2001 |

* cited by examiner

Primary Examiner—Sophia S. Chen
(74) Attorney, Agent, or Firm—Fitzpatrick, Cella, Harper & Scinto

(57) ABSTRACT

A conveying guide base is formed integrally with an original base frame. When an original fed by an automatic original feeding apparatus is read, an image reading unit is set to stay at a predetermined reading position and an image of the original is read by the image reading unit under this condition. Also, a detecting unit detects that an original is placed on an original placing unit provided for the automatic original feeding apparatus. Then, if an image reading operation start unit is operated to start an image reading operation, in the case where a detection signal is inputted from the detecting unit, a position control unit performs control so that the image reading unit is moved from a stand-by position to a predetermined reading position before the original is fed by the automatic original feeding apparatus.

10 Claims, 11 Drawing Sheets

IMAGE READING APPARATUS AND AN IMAGE FORMING APPARATUS HAVING THE IMAGE READING APPARATUS

BACKGROUND OF THE INVENTION

1. Field of the Invention

The present invention relates to an image forming apparatus that forms an image on a recording medium. In particular, the present invention relates to an image reading apparatus that supports both of a flow reading method and an original fixing method and has a size that is smaller than that of a conventional one, and relates to an image forming apparatus equipped with this image reading apparatus. Also, the present invention relates to an image reading apparatus that is capable of increasing productivity by preventing the occurrence of a time that is unnecessarily consumed to move an image reading means, and relates to an image forming apparatus equipped with this image reading apparatus.

2. Related Background Art

Conventionally, there has been used an image forming apparatus that reads an image recorded on an original (reads the original) and forms this read image on a recording medium such as recording paper. As a method for reading the original, there have been known so-called flow reading method and original fixing method.

With the flow reading method, a contact image sensor (hereinafter referred to as the "CIS") or the like for reading an original is fixed below an original base glass and the original is moved to pass through a region (a reading region) of this original base glass above the CIS, thereby reading the original using the CIS. On the other hand, with the original fixing method, an original is abutted against an original abutting board formed in the vicinity of one end portion of the original base glass, and the original is placed on the original base glass. The CIS is moved in a predetermined reading direction under this condition, thereby reading the original.

Image forming apparatuses that are capable of performing the flow reading method are classified into a type where a conveying member for conveying an original is arranged on the entire upper surface of an original base glass and a type where a sheet feeding unit for feeding an original to a reading region is arranged in one end portion of an original base glass. In the case of the type where there is used this sheet feeding unit, it is not required to arrange a conveying member on the entire upper surface of the original base glass, whereby weight reduction is realized.

A conventional example of the image forming apparatus of the type where the sheet feeding unit described above is used will be described with reference to FIG. 10.

FIG. 10 is a schematic diagram showing an example of the conventional image forming apparatus.

The image forming apparatus 10 is broadly divided into a reading portion 20 for reading an original and an image forming portion 100 for forming an image read by this reading portion 20 on a recording medium.

The reading portion 20 includes an automatic original feeding unit 30 having an original placing tray 32 on which an original is placed, a plurality of conveying rollers 34 for conveying the original placed on the original placing tray 32 to a reading region 22 in which the original is to be read, and an original discharging tray 36 on which the original having passed through the reading region 22 is placed. In the reading region 22, there is arranged a platen glass 24 above which the original passes. Also, a CIS 26 is arranged below the platen glass 24. The original placed on the original placing tray 32 is fed to the reading region 22 by the plurality of conveying rollers 34, is read by the CIS 26 while passing through the reading region 22, and is discharged to the original discharging tray 36 while being guided by a conveying guide base 38.

The image forming apparatus 10 is also equipped with an original base glass 40 for fixing and reading an original. Also, an original abutting board 42, against which an original placed on the original base glass 40 is abutted, is arranged in the vicinity of one end portion of the original base glass 40. In the case where the original is read with the original fixing method described above, a user abuts the original against the original abutting board 42 to position the original on the original base glass 40, and the original is read by moving the CIS 26 in a reading direction (a direction indicated by an arrow E).

The original read with the flow reading method or the original fixing method in the manner described above is formed on a recording medium in the image forming portion 100 arranged below the original base glass 40. A construction of this image forming portion 100 will be described later with reference to FIG. 10.

In the image forming apparatus 10 described above, the conveying guide base 38 becomes an indispensable construction element in the case of the flow reading method and the original abutting board 42 becomes an indispensable construction element in the case of the original fixing method. The conveying guide base 38 and the platen glass 24 are arranged outside of the original abutting board 42 so as to avoid the original abutting board 42. Consequently, the platen glass 24 for performing a flow reading operation is provided separately from the original base glass 40, thereby the size of the image forming apparatus 10 is increased accordingly.

Also, in a conventional image reading apparatus that reads an image of an original fed by such an automatic original feeding apparatus and in an image forming apparatus equipped with this image reading apparatus, an image reading unit 1106 is ordinarily positioned at a stand-by position for performing a leftward fixed reading operation indicated by a broken line in FIG. 11. In the case where a flow reading operation is performed, it is required to move the image reading unit from this stand-by position to a rightward predetermined reading position indicated by a solid line in this drawing. Consequently, in the case where a flow reading operation is performed, a redundant time is consumed to move the image reading unit 1106 from the stand-by position to the reading position, which elongates an image reading operation start time for the first sheet.

In view of this problem, in order to shorten the image reading operation start time for the first sheet, for instance, there is proposed a construction where before a user performs an operation to designate the start of a reading operation, when an original S is placed on an original placing tray 1102 of the automatic original feeding apparatus, a sensor 1104 detects this situation and the image reading unit 1106 starts to move from a stand-by position to a reading position in advance on the basis of a detection signal from this sensor 1104.

However, with this method, once the original S is set on the original placing tray 1102, the image reading unit 1106 starts to move. Consequently, in the case where the user of the apparatus erroneously places an original on the original placing tray 1102 and the original should be placed on an original base glass 1127, or in the case where a reading operation is performed by directly placing the original S on the original base glass 1127 after an original reading operation that uses the automatic original feeding apparatus is performed, it becomes impossible to start the reading operation until the image reading unit 1106 returns to the stand-by position.

That is, there occurs a time that is unnecessarily consumed to move the image reading unit 1106. Also, in the case where there occurs such a time that is unnecessarily consumed to move the image reading unit, the productivity of the image forming apparatus is decreased.

SUMMARY OF THE INVENTION

In view of the circumstances described above, an object of the present invention is to provide an image forming apparatus that supports both of a flow reading method and an original fixing method and also has a size that is smaller than that of a conventional one.

Also, the present invention has been made in view of the stated current circumstances, and another object of the present invention is to provide an image reading apparatus that is capable of increasing productivity by preventing the occurrence of a time that is unnecessarily consumed to move a reading unit (an image reading means), and an image forming apparatus equipped with this image reading apparatus.

In order to achieve the above-mentioned object, according to the present invention, there is provided an image forming apparatus including an original base glass for which a predetermined image reading region is formed and on which an original is placed, image reading means that is arranged below the original base glass and reads an image of the original, and an original automatic conveying apparatus that conveys the original to the image reading region, the image forming apparatus forming the read image on a recording medium by reading the image of the original by selecting one of an original fixing scanning mode and an image flow reading scanning mode, the original fixing scanning mode being a mode with which the original is placed on the original base glass and the image of the original is read by having the image reading means perform scanning in a predetermined scanning direction below the original base glass, and the image flow reading scanning mode being a mode with which the image reading means is set to stay below the image reading region and the image of the original is read using the image reading means in the image reading region by conveying the original to the image reading region using the original automatic conveying apparatus, the image forming apparatus characterized by comprising:

(1) an abutting member which is formed in the vicinity of one end portion of the original base glass and against which the original placed on the original base glass is abutted when the original fixing scanning mode is selected; and (2) a conveying guide base that is formed on the other end portion side of the original base glass opposite to the abutting member and guides the original conveyed to the image reading region by the original automatic conveying apparatus to a predetermined sheet discharging tray.

In this case, (3) at least one of the abutting member and the conveying guide base may be formed integrally with an original base frame to which the original base glass is fixed.

Also, (4) in the conveying guide base, (4-1) the conveying guide base may be formed integrally with the original base frame to which the original base glass is fixed, and (4-2) a position, at which the original base glass may be fixed, is determined by abutment of the original base glass against the original base frame when the original base glass is fixed to the original base frame.

Further, the image forming apparatus may comprise (5) a photosensitive drum on which a developed image of an image read by the image reading means is formed, and a fixing device that fixes the developed image on the recording medium conveyed from the photosensitive drum.

(6) The original base glass may have the image reading region formed in one end portion thereof on a side opposite to the fixing device with the photosensitive drum being sandwiched therebetween.

(7) The image reading means may stay below the image reading region when the image flow reading scanning mode is selected.

Still further, (8) the original base glass may include the image reading region that is formed to be used in the image flow reading scanning mode, and the original glass is placed on the original base when the original fixing scanning mode is selected.

Also, the present invention is an image reading apparatus that includes an image reading means for reading an image of an original, that reads the image of the original by moving the image reading means from a stand-by position along a platen glass when the original is placed on the platen glass, and that reads the image of the original under a condition where the image reading means stays at a predetermined reading position when the original is fed from an automatic original feeding apparatus. The image reading apparatus according to the present invention is characterized in that: a detecting means for detecting that the original is placed on an original placing means provided for the automatic original feeding apparatus, an image reading operation start means that is operated to start an image reading operation, and a position control means that moves the image reading means from the stand-by position to the predetermined reading position before the original is fed by the automatic original feeding apparatus are provided; and if a detection signal is inputted from the detecting means when the image reading operation start means is operated, the position control means moves the image reading means from the stand-by position to the predetermined reading position.

Also, the present invention is characterized by that when no detection signal is inputted from the detecting means, the position control means judges that the image reading is finished and moves the image reading means from the predetermined reading position to the stand-by position.

As described above, in the image forming apparatus of the present invention, an original abutting member, against which the original placed on the original base glass is abutted, is formed in the vicinity of one end portion of the original base glass. In the case where the conveying guide base is formed in the vicinity of the other end portion of the original base glass on a side opposite to the one end portion, an automatic original feeding unit can be arranged in the vicinity of the other end portion of the original base glass. This makes it possible to widen the original base glass (or to arrange a small original base glass separately from the original base glass), thereby reducing the size of the original base frame in comparison with a construction where the automatic original feeding unit is arranged in the vicinity of the one end portion of the original base glass. As a result, it becomes possible to reduce the size of the original base frame and to reduce the size of the image forming apparatus accordingly.

Here, in the case where at least one of the abutting member and the conveying guide base is formed integrally with the original base frame to which the original base glass is fixed, it is possible to produce these construction elements without difficulty and also to reduce the number of components.

Also, in the case where the conveying guide base is formed integrally with the original base frame to which the original base glass is fixed and the position, at which the original base glass is fixed, is determined by the abutment of the original base glass against the original base frame when the original base glass is fixed to the original base frame, the conveying guide base doubles as a member for positioning the original base glass and the number of components can be reduced accordingly.

Further, there are provided a photosensitive drum, on which a developed image of an image read by the image reading means is formed, and a fixing device that fixes the developed image on a recording medium conveyed from the photosensitive drum. The image reading region is formed in one end portion of the original base glass on a side opposite to the fixing device with the photosensitive drum being sandwiched therebetween. In the case where the image reading means stays below the image reading region because the image flow reading scanning mode is selected, the image reading region is formed in the one end portion of the original base glass on a side opposite to the fixing device with the photosensitive drum being sandwiched therebetween. Accordingly, the image reading means is separated from the fixing device in the image flow reading scanning mode. Consequently, the image reading means is hardly influenced by heat generated by the fixing device. As a result, even if the image reading means is vulnerable to heat, it becomes unnecessary to provide a cooling apparatus or the like that cools this image reading means and thereby the number of components can be reduced accordingly. As a result, it becomes possible to reduce the size of the image forming apparatus.

Further, in the case where the original base glass includes the image reading region formed to be used in the image flow reading scanning mode and an original is placed on the original base glass when the original fixing scanning mode is selected, a single original base glass is commonly used in both of the image flow reading scanning mode and the original fixing scanning mode, which means that it is not required to use two original base glasses. As a result, it becomes possible to further reduce the number of components accordingly and to reduce the size of the image forming apparatus.

Also, with the present invention, in the case where an original is placed on the original placing means when the image reading operation start means is operated to start an operation for reading an image of an original fed from the automatic original feeding apparatus, it becomes possible to prevent the occurrence of a time that is unnecessarily consumed to move the image reading means and to increase productivity by moving the image reading means from the stand-by position to the predetermined reading position before the original is fed.

DETAILED DESCRIPTION OF THE PREFERRED EMBODIMENTS

Embodiments of the present invention will be described below with reference to the drawings.

First Embodiment

A first embodiment of an image forming apparatus of the present invention will be described with reference to FIGS. 1 and 2.

Figure 1:
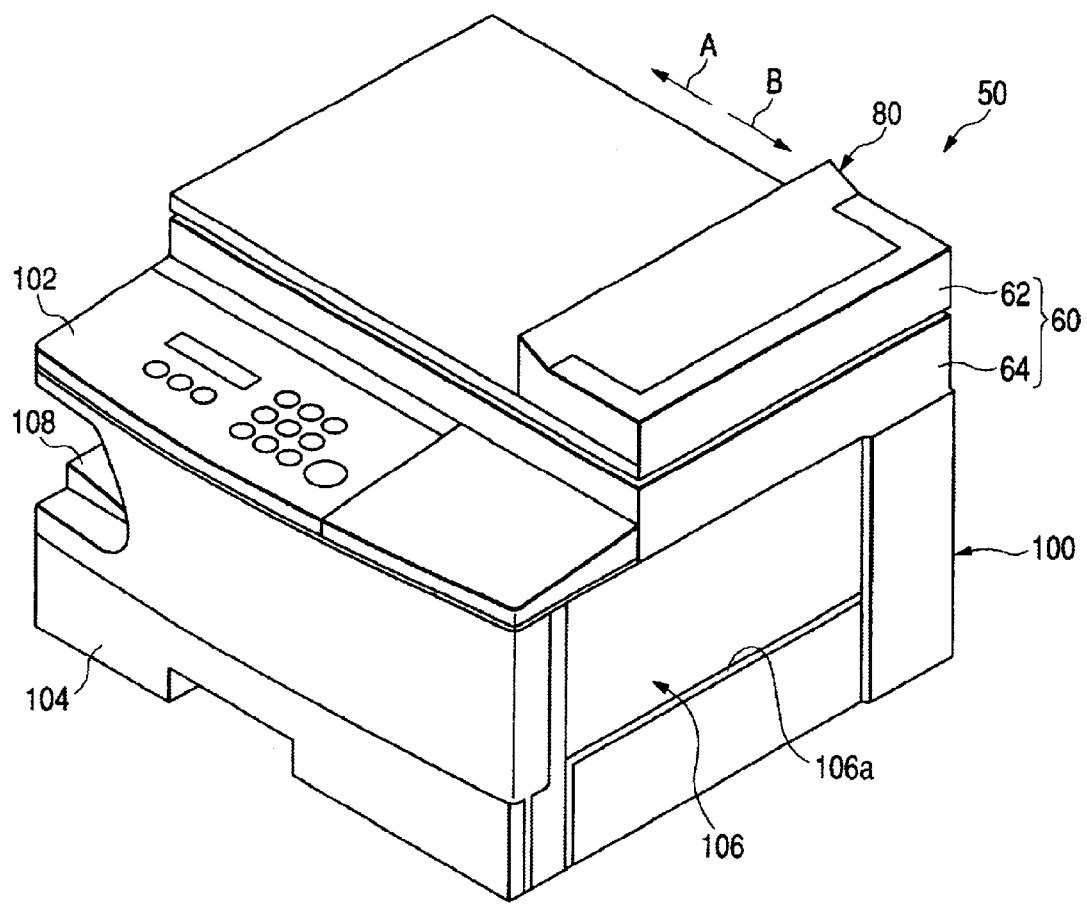
FIG. 1 is a perspective view showing an external appearance of a digital copying machine that is an embodiment of an image forming apparatus of the present invention.

FIG. 1 is a perspective view showing an external appearance of a digital copying machine that is the first embodiment of the image forming apparatus of the present invention. FIG. 2 is a perspective view showing the external appearance of the digital copying machine in FIG. 1 under a condition where an original pressure board is opened.

The copying machine 50 includes a first case 60, in which there are installed a plurality of components for reading an image recorded on an original, and a second case (image forming portion) 100 in which there are installed a plurality of components for forming the image on a recording medium. The second case 100 is arranged below the first case 60 as shown in the drawings. Accordingly, the first case 60 is placed on the second case 100.

On the top surface of the copying machine 50, there is arranged an original pressure board 62 having a cuboid shape. It is possible to freely open and close this original pressure board. Under the original pressure board 62, there is arranged an optical case 64 in which there is installed a well-known optical system (not shown). The optical system is provided with a light source LED (not shown) and the like. The upper surface (upper wall) of the optical case 64 is an original base glass 61 on which an original is placed. The original pressure board 62 and the optical case 64 constitute the first case 60.

In one end portion of the original base glass 61 on a side opposite to a fixing device 126 with a photosensitive drum (see FIG. 3) being sandwiched therebetween, there is formed an image reading region 82 in which an image of an original is read. Also, on a slightly downstream side in a direction indicated by an arrow B with reference to the image reading region 82, there is formed a conveying guide base 95 that guides an original conveyed to the image reading region 82 to a sheet discharging tray 86. The conveying guide base 95 has a long and narrow shape that extends in a direction orthogonal to the directions indicated by the arrows A and B. The conveying guide base 95 includes an inclined plane 95a formed so as to direct the original upward while contacting the original. On the other hand, in the other end portion of the original base glass 61 on a side opposite to the one end portion in which the conveying guide base 95 is formed, there is formed an abutting board 67 (an example of the abutting member of the present invention) against which the original placed on the original base glass 61 is abutted. This abutting board 67 has a long and narrow shape that extends in a direction orthogonal to the directions indicated by the arrows A and B. As described above, the conveying guide base 95 and the abutting board 67 are respectively formed on both end sides of the single original base glass 61, which precludes the necessity to use two original base glasses. Consequently, the number of components is reduced accordingly, which makes it possible to reduce the size of the copying machine 50.

In the original pressure board 62, there is installed an original automatic conveying apparatus 80 that automatically feeds the original. This original automatic conveying apparatus 80 will be described later with reference to FIG. 3 and other drawings.

On a side (front side) of the second case 100 existing frontward with reference to the first case 60, there is arranged an operation panel 102 with which the number of copies to be made and the like are inputted. In the lower portion of the second case 100, there is provided a cassette 104 in which a plurality of pieces of cut paper are contained. It is possible to freely insert and extract this cassette into and from the second case 100. On the right wall of the second case 100, there is provided a manual paper feeding tray 106 having a rectangular shape, thereby making it possible to feed small sized recording paper like a postal card. This manual paper feeding tray 106 rotates in a direction indicated by an arrow C (see FIG. 3) about a low side portion 106a and is opened to a position at which it is possible to place a recoding medium. Also, a space is formed in the leftward portion of the second case 100 and there is formed a sheet discharging tray 108 on which discharged recording paper is stacked.

A procedure by which the copying machine 50 forms an image and the like will be described with reference to FIG. 3.

Figure 3:
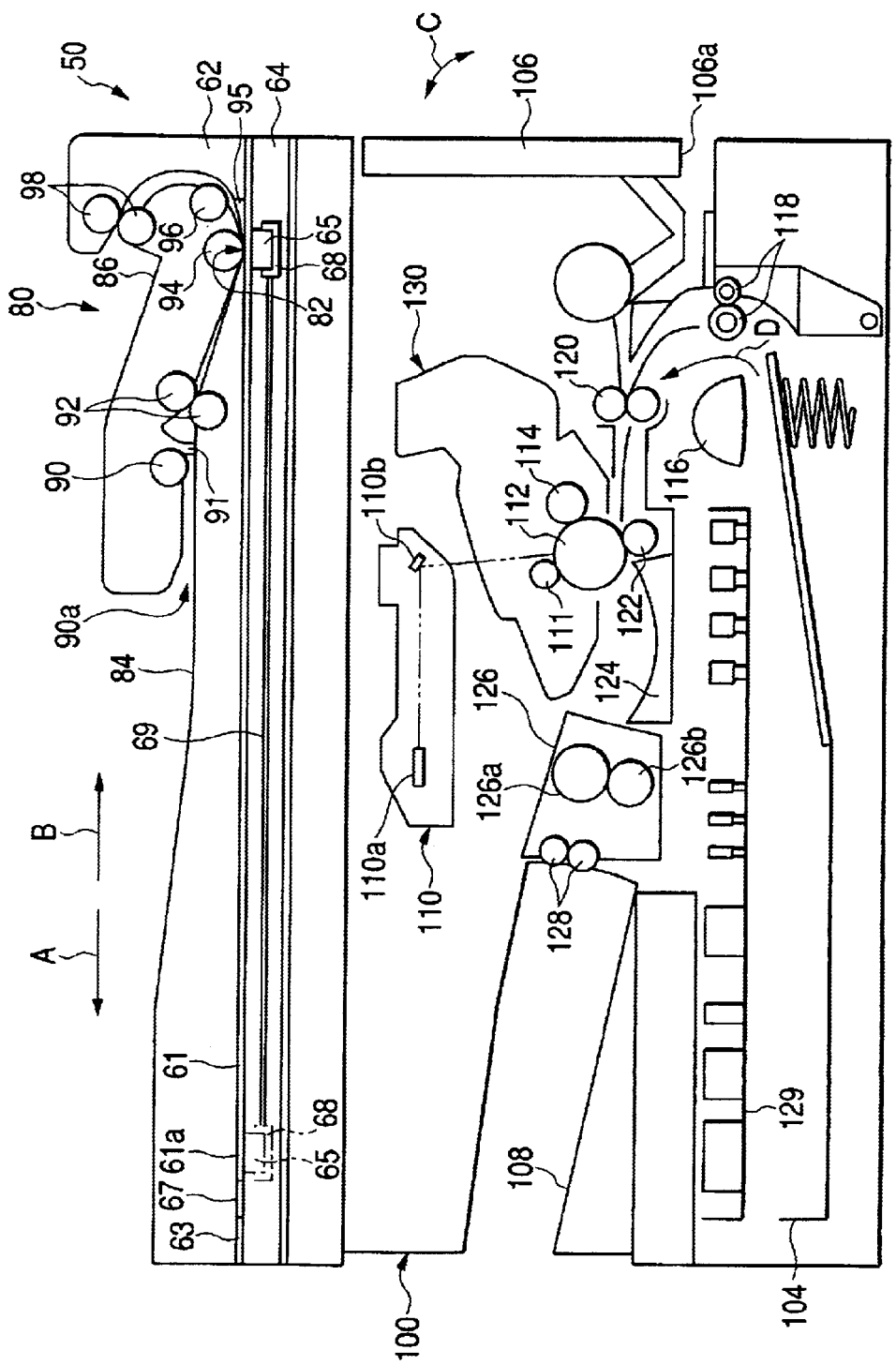
FIG. 3 is a schematic diagram showing an internal construction of the copying machine in FIG. 1.

FIG. 3 is a schematic diagram showing an internal construction of the copying machine.

The copying machine 50 is capable of selecting one of the flow reading method and the original fixing method to form an image recorded on an original on a recording medium.

In the case where the original fixing method is selected, the original pressure board 62 is first opened. Then, an original is placed on the upper surface of the original base glass 61 and this original is pressed and fixed with the original pressure board 62. Next, by pushing a predetermined operation button or the like, a CIS (contact image sensor) 65 (an example of the reading means of the present invention) installed in the optical case 64 performs scanning in the direction indicated by the arrow B from a position indicated by a chain double-dashed line. With this CIS 65, an image recorded on the original is read. The read image is converted into a digital signal, which is then sent to a laser scanner 110. Note that the original base glass 61 is fixed to a rectangular original base frame 63 formed in the optical case 64. Also, the CIS 65 is installed in an image reading unit 68. The image reading unit 68 is driven by a drive motor (not shown) or a drive belt (not shown) and moves in the directions indicated by the arrows A and B while being guided by a guide axis 69.

The original base glass 61 described above is fixed to the rectangular original base frame 63 formed in the optical case 64. In the vicinity of one end portion 61a of the original base glass 61 fixed to this original base frame 63, there is formed an original abutting board 67 (an example of the original abutting member of the present invention) against which an original is abutted when this original is placed on the original base glass 61. This original abutting board 67 extends in a direction perpendicular to the directions indicated by the arrows A and B and is used to position the original when the original is placed on the original base glass 61.

There will be described a case where the flow reading method is selected.

To perform a flow reading operation for an original, the copying machine 50 is equipped with an automatic original feeding unit 80. The automatic original feeding unit 80 automatically feeds an original so that the original passes through the reading region 82 in which an image recorded on the original is read (the original is read). The reading region 82 is formed in a portion on the downstream side of the original base glass 61 in the direction indicated by the arrow B, and extends in a direction perpendicular to the direction indicated by the arrow B. Note that in the case where the copying machine 50 selects the flow reading method, the CIS 65 moves to a side opposite to the reading region 82 (the lower side of the original base glass 61) with the original base glass 61 being sandwiched therebetween.

In the automatic original feeding unit 80, there are formed an original placing tray 84, on which the original is placed, and the original discharging tray 86 on which the original having passed through the reading region 82 is placed. Also, in the automatic original feeding unit 80, there are installed a plurality of rollers (a sheet feeding roller 90, a registration roller pair 92, and the like) that convey the original placed on the original placing tray 84 to the original discharging tray 86 through the reading region 82.

The original placed on the original placing tray 84 is fed to the registration roller pair 92 from a sheet feeding opening 90a by the sheet feeding roller 90. The registration roller pair 92 performs skew feeding correction. The original that has been subjected to the skew feeding correction is conveyed to a platen roller 94 by the registration roller pair 92 and passes through the reading region 82. The CIS 65 is positioned in this reading region 82 and the original is read by the CIS 65 while passing through the reading region 82. The read image is converted into a digital signal, which is then sent to the laser scanner 110.

The original that has passed through the reading region 82 is guided to a reversing roller 96 by the conveying guide base 95 including an inclined plane formed to direct the original upward. The reversing roller 96 reverses the front surface and the rear surface of the original and conveys it to a sheet discharging roller 98. The original conveyed to the sheet discharging roller 98 is discharged to the original discharging tray 96 by this sheet discharging roller 98.

As described above, in the copying machine 50, regardless of which one of the flow reading method or the original fixing method is used, a read image of an original is converted into a digital signal, which is then sent to the laser scanner 110. The signal sent to the laser scanner 110 is converted into a laser light, which is then irradiated onto a photosensitive drum 112 through a scanner mirror 110*a* that rotates at high speed and a return mirror 110*b*. The photosensitive drum 112 is uniformly charged by a charger 111 and an electrostatic latent image is formed on the photosensitive drum 112 onto which the laser light is irradiated. This electrostatic latent image is developed by a developer supplied from a developing roller 114, thereby forming a developed image.

On the other hand, a recording medium, such as recording paper, is fed from the cassette 104 by the sheet feeding roller 116 in a direction indicated by an arrow D (in a sheet feeding direction) and is conveyed to a transferring device 122 by a conveying roller 118 and a registration roller 120. In the transferring device 122, the developed image on the photosensitive drum 112 is transferred onto the conveyed recording medium. The recording medium, on which the developed image has been transferred, is conveyed to a fixing device 126 by a conveying apparatus 124. In the fixing device 126, there are arranged a fixing roller 126*a* and a pressurizing roller 126*b*. The recording medium is conveyed while being nipped between these two rollers 126*a* and 126*b*, thereby fixing the developed image on the recording medium. The recording medium, on which the developed image has been fixed in this manner, is discharged by the sheet discharging roller 128 and is stacked on the sheet discharging tray 108.

It should be noted here that it is possible to feed a recording medium from the manual paper feeding tray 106. The formation of an image on the recording medium fed from the manual paper feeding tray 106 is performed by the same procedure as described above. Further, in the copying machine 50, there is also embedded an electrical substrate 129 on which a power source and electrical components for driving various components are placed.

As described above, various components and members are installed in the copying machine 50. Among these components, the charger 111, the photosensitive drum 112, the developing roller 114, and the like are installed in a process cartridge 130. This process cartridge 130 is provided detachably attachable to the copying machine 50.

The original base glass 61 and members around this glass will be described with reference to FIGS. 4 and 5.

Figure 4:
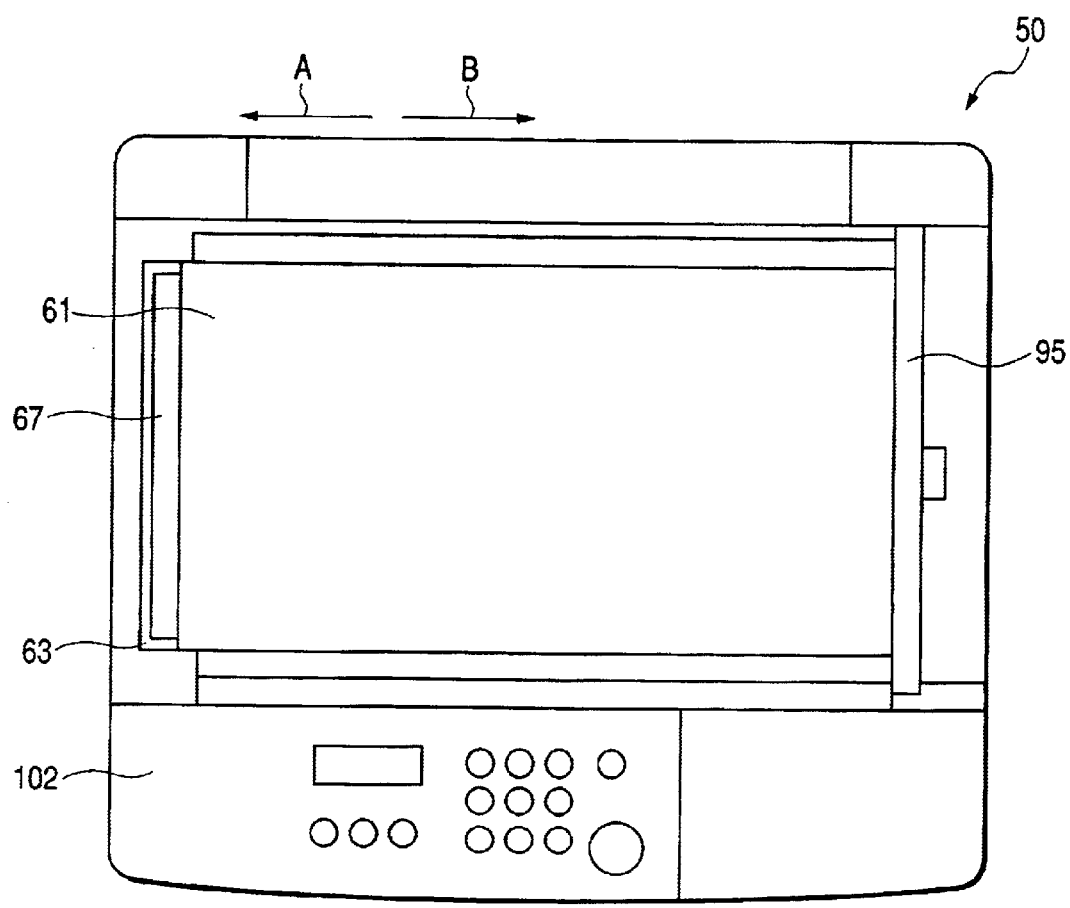
FIG. 4 is a top view taken from above of the copying machine under a condition where the original pressure board is removed.
Figure 5:
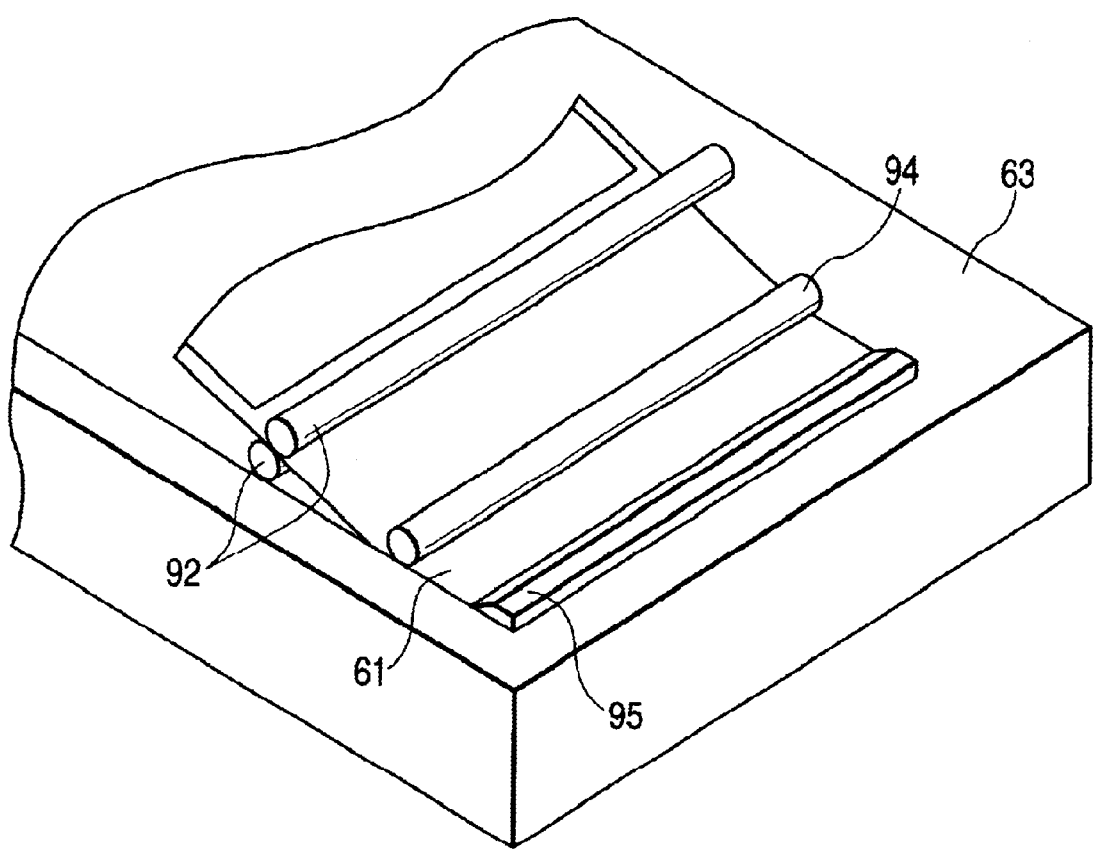
FIG. 5 is a perspective view that schematically shows a state where an original is fed by an automatic original feeding unit.

FIG. 4 is a top view taken from above of the copying machine under a condition where the original pressure board is removed. FIG. 5 is a perspective view that schematically shows a state where an original is fed by the automatic original feeding unit.

As described above, the original base frame 63 is formed in the optical case 64. The aforementioned conveying guide base 95 is formed integrally with this original base frame 63 with injection molding or the like. This makes it possible to reduce the size of the copying machine 50 in comparison with a case where the conveying guide base 95 is formed at a position that is different from the position of the original base frame 63. It is also possible to reduce the number of components in comparison with a case where the conveying guide base 95 is formed as a component separated from the original base frame 63.

Also, when the original base glass 61 is fixed to the original base frame 63, the original base glass 61 is abutted against the conveying guide base 95. Accordingly, the position, at which the original base glass 61 is fixed, is determined by the conveying guide base 95, so that the conveying guide base 95 doubles as a member for positioning the original base glass 61 and therefore the number of components is reduced accordingly.

By the way, in the vicinity of the one end portion of the original base glass 61, in the case where the original fixing method is selected, there is formed the original abutting board 67 against which an original placed on the original base glass 61 is abutted for positioning. On the other hand, the conveying guide base 95 described above is formed in the vicinity of the other end portion on a side opposite to the one end portion of the original base glass 61. Accordingly, it becomes possible to arrange the automatic original feeding unit 80 in the vicinity of the other end portion of the original base glass 61. In the case of a construction where the automatic original feeding unit 80 is conversely arranged in the vicinity of the one end portion of the original base glass 61, it is required to widen the original base glass 61 (or to arrange a small original base glass separated from the original base glass 61), thereby the size of the original base frame 63 is increased (widened) accordingly. As described above, in the copying machine 50, the conveying guide 95 and the original abutting board 67 are respectively formed at both end sides of the single original base glass 61, which precludes the necessity to use two original base glasses and makes it possible to reduce the size of the original base frame 63. As a result, it becomes possible to reduce the size of the copying machine 50 accordingly.

Also, in the copying machine 50, when the CIS 65 reads an original placed on the original base glass 61, the CIS 65 starts to read the original from the vicinity of the original abutting board 67 and continues the reading of the original while moving in the direction indicated by the arrow B. Accordingly, it becomes possible to swiftly start the reading of the original without moving the CIS 65 from the vicinity of the original abutting board 67.

Second Embodiment

A digital copying machine 150 (an image forming apparatus of according to a second invention of the present invention) of a second embodiment will be described with reference to FIG. 6.

Figure 6:
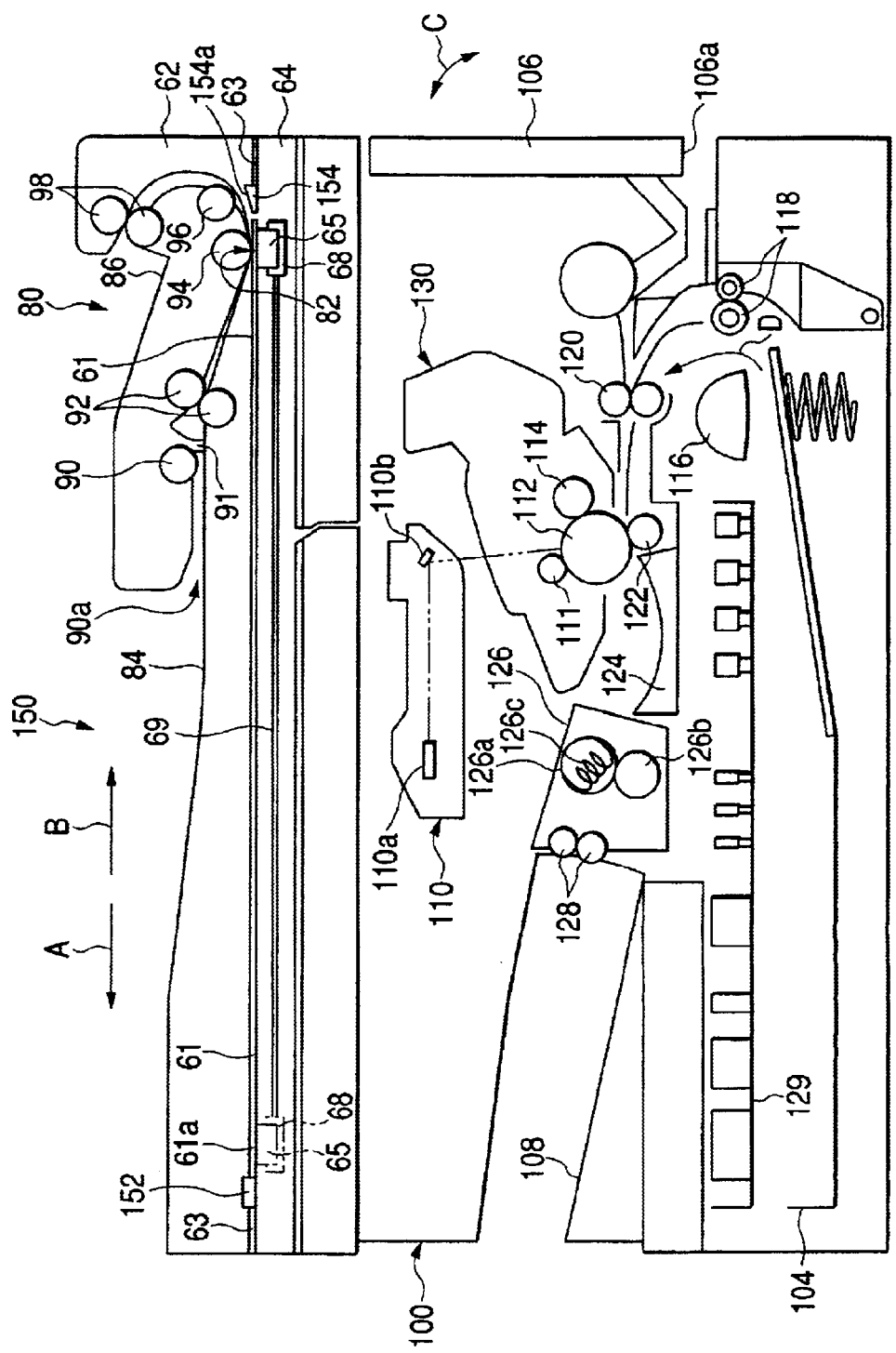
FIG. 6 is a schematic diagram showing an internal construction of a digital copying machine of a second embodiment of the present invention.

FIG. 6 is a schematic diagram showing an internal construction of the digital copying machine of the second embodiment.

Figure 2:
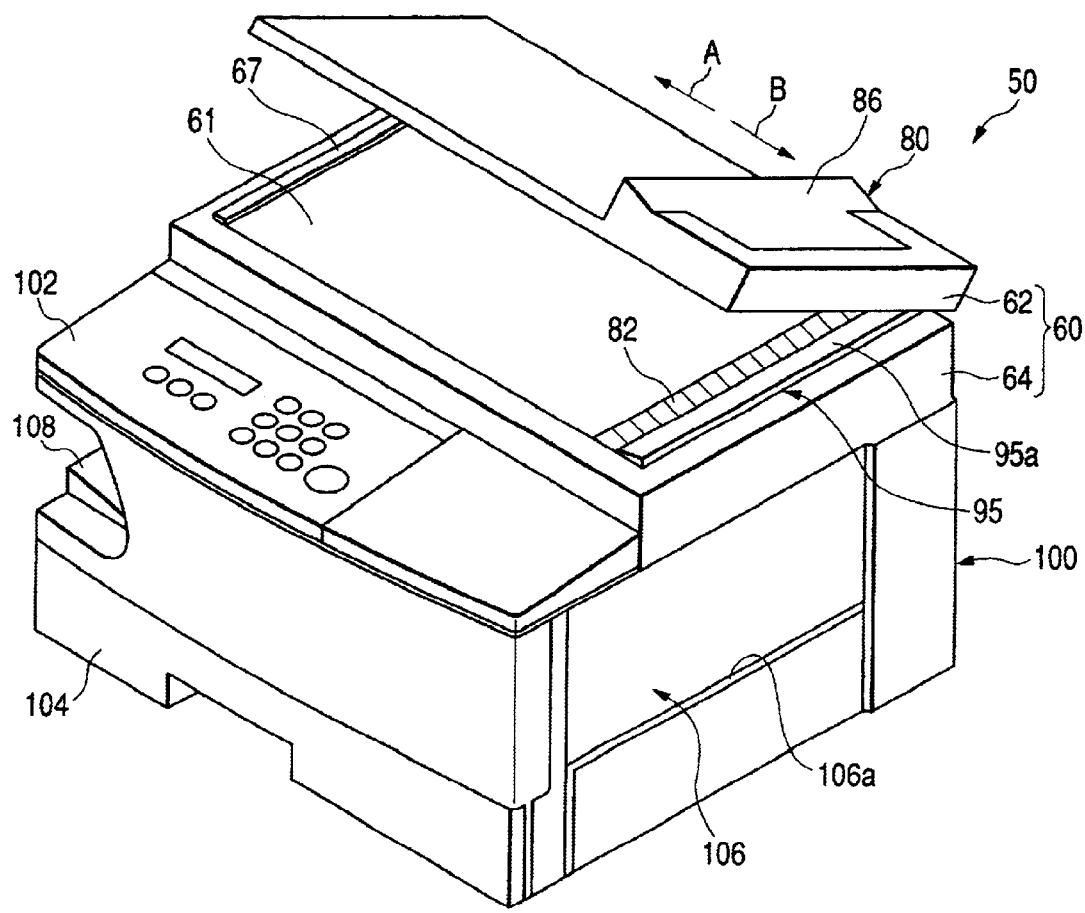
FIG. 2 is a perspective view showing the external appearance of the digital copying machine in FIG. 1 under a condition where an original pressure board is opened.

The basic construction of the digital copying machine 150 of the second embodiment is the same as that of the digital copying machine 50 of the first embodiment and construction elements that are the same as those shown in FIGS. 1 and 2 are given the same reference symbols.

When forming an image recorded on an original on a recording medium, the digital copying machine 150 is capable of selecting one of an original fixing scanning mode and an image flow reading scanning mode. The original fixing scanning mode means a mode with which an original is placed on an original base glass 61 and an image of the original is read through scanning where a CIS (contact image sensor) 65 (an example of the reading means of the present invention) moves below the original base glass 61 in a direction indicated by an arrow B (a scanning direction). On the other hand, the image flow reading scanning mode means a mode with which under a condition where the CIS 65 stays below an image reading region 82, an image on an original is read in the image reading region 82 using the CIS 65 while an original automatic conveying apparatus 80 conveys the original to the image reading region 82.

In the case where the original fixing scanning mode is selected, an original pressure board 62 is first opened. Then, an original is placed on the upper surface of the original base glass 61 and is abutted against an abutting board 152, thereby positioning this original. Following this, the original is pressed and fixed with the original pressure board 62. Next, by pushing a predetermined operation button or the like, the CIS 65 installed in an optical case 64 performs scanning in the direction indicated by the arrow B from a position indicated by a chain double-dashed line, thereby reading an image recorded on the original with this CIS 65. The read image is converted into a digital signal, which is then sent to a laser scanner 110. Note that the original base glass 61 is fixed to a rectangular original base frame 63 formed in the optical case 64. Also, the CIS 65 is installed in an image reading unit 68. The image reading unit 68 is driven by a drive motor (not shown) or a drive belt (not shown) and moves in the directions indicated by the arrows A and B while being guided by the guide axis 69.

There will be described a case where the image flow reading scanning mode is selected.

To perform a flow reading operation for an original, the digital copying machine 150 is equipped with the original automatic conveying apparatus 80. This original automatic conveying apparatus 80 automatically feeds an original so that the original passes through the image reading region 82 in which an image recorded on the original is read (an image of the original is read). The image reading region 82 is formed in a portion on the downstream side of the original base glass 61 in the direction indicated by the arrow B as described above, and extends in a direction perpendicular to the direction indicated by arrow B. Also, in the case where the digital copying machine 150 selects the image flow reading scanning mode, the CIS 65 stays on a side opposite to the image reading region 82 (the lower side of the original base glass 61) with the original base glass 61 being sandwiched therebetween.

The image reading region 82 described above is formed in one end portion of the original base glass 61 on a side opposite to a fixing device 126, with a photosensitive drum 112 being sandwiched therebetween. Also, if the number of originals that should be read is large when the image flow reading scanning mode is selected, a time, during which the CIS 65 stays, is elongated. The CIS 65 is generally vulnerable to heat, but in the image flow reading scanning mode of this embodiment, the staying CIS 65 exists separately from the fixing device 126. Accordingly, the CIS 65 is hardly influenced by the heat generated by the fixing device 126. As a result, it is not required to provide the digital copying machine 150 with a cooling apparatus or the like for cooling the CIS 65. Accordingly, it becomes possible to reduce the number of components and to reduce the size of the digital copying machine 150.

In the original automatic conveying apparatus 80, there are formed an original placing tray 84, on which an original is placed, and an original discharging tray 86 on which the original having passed through the image reading region 82 is placed. Also, in the original automatic conveying apparatus 80, there are installed a plurality of rollers (a sheet feeding roller 90, a registration roller pair 92, and the like) that convey the original placed on the original placing tray 84 to the original discharging tray 86 through the image reading region 82.

The original placed on the original placing tray 84 is fed to the registration roller pair 92 from a sheet feeding opening 90a by the sheet feeding roller 90. The registration roller pair 92 performs skew feeding correction. The original that has been subjected to the skew feeding correction is conveyed to a platen roller 94 by the registration roller pair 92 and passes through the image reading region 82. A spacer (not shown) for forming a space between the roller surface of the platen roller 94 and the upper surface of the original base glass 61 is provided at both end portions of the platen roller 94 in a lengthwise direction. This spacer makes it possible to convey this original while having the image surface of the original contact the upper surface of the original base glass 61. Note that in the vicinity of the sheet feeding roller 90, there is arranged a detection sensor 91 for detecting the presence or absence of a recording medium.

The CIS 65 is positioned below the image reading region 82 and the original passing through the image reading region 82 is illuminated by an LED (not shown) and is read by the CIS 65. The read image is converted into a digital signal, which is then sent to the laser scanner 110.

The original having passed through the image reading region 82 is guided to a reversing roller 96 by the conveying guide base 154 that includes an inclined surface 154a formed so as to direct the original upward. The reversing roller 96 reverses the front surface and the rear surface of the original and conveys it to a sheet discharging roller 98. The original conveyed to the sheet discharging roller 98 is discharged to the original discharging tray 86 by this sheet discharging roller 98.

As described above, in the digital copying machine 150, regardless of which one of the image flow reading scanning mode or the original fixing scanning mode is used, a read image of an original is converted into a digital signal, which is then sent to a laser scanner 110. The signal sent to the laser scanner 110 is converted into a laser light, which is then irradiated onto the photosensitive drum 112 through a scanner mirror 110a that rotates at high speed and a return mirror 110b. The photosensitive drum 112 is uniformly charged by a charger 111 and an electrostatic latent image is formed on the photosensitive drum 112 through the irradiation of the laser light. This electrostatic latent image is developed by a developer supplied from a developing roller 114, thereby forming a developed image.

On the other hand, a recording medium, such as recording paper, is fed from a cassette 104 by a sheet feeding roller 116 in a direction indicated by an arrow D (in a sheet feeding direction) and is conveyed to a transferring device 122 by a conveying roller 118 and a registration roller 120. In the transferring device 122, the developed image on the photosensitive drum 112 is transferred onto the conveyed recording medium. The recording medium, on which the developed image has been transferred, is conveyed to the fixing device 126 by a conveying apparatus 124. In the fixing device 126, there are arranged a heating roller 126a and a pressurizing roller 126b. The recording medium is conveyed while being nipped between these two rollers 126a and 126b, so that the developed image is fixed on the recording medium. The recording medium, on which the developed image has been fixed in this manner, is discharged by the sheet discharging roller 128 and is stacked on the sheet discharging tray 108.

It should be noted here that a heater 126c is embedded in the heating roller 126a of the fixing device 126 described above. Control is performed so that the heater 126c is heated when an image is to be formed on a recording medium but is not heated when no image is to be formed on a recording medium. That is, the heater 126c is controlled using a so-called on-demand method.

Third Embodiment

Next, there will be described a third embodiment of the present invention.

Figure 8:
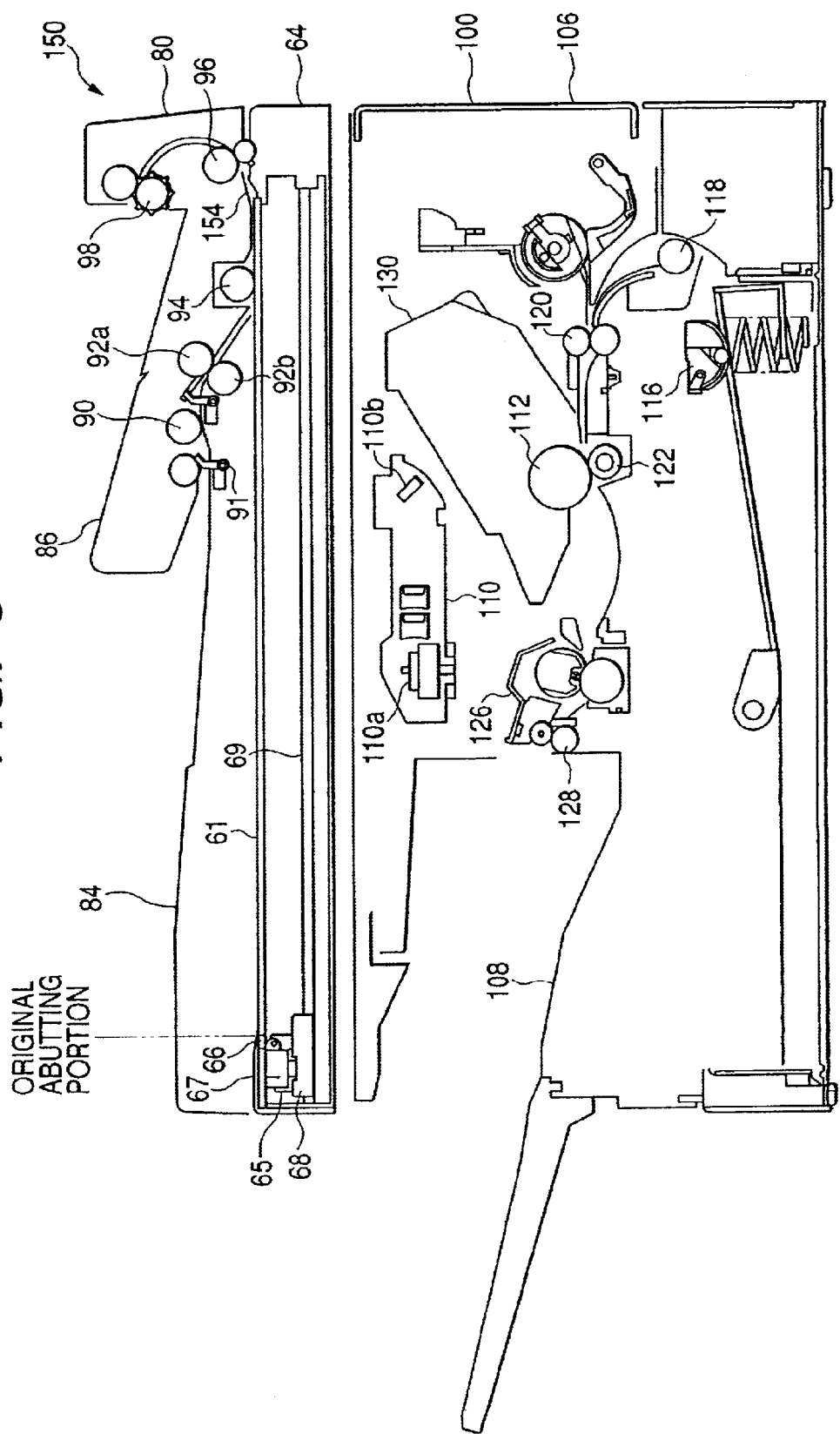
FIG. 8 shows an outline of a construction of the digital copying machine.

FIG. 8 is a drawing showing an outline of a construction of a digital copying machine that is an example of an image forming apparatus according to this embodiment.

In this drawing, reference numeral 65 denotes a CIS that is provided in an image reading unit 68 and reads an original placed on an original base glass 61, and reference numeral 69 represents a guide axis that guides the movement and scanning of the image reading unit 68.

It should be noted here that the image reading unit 68 includes the CIS 65 and an unillustrated LED for illuminating an original to be read through the original base glass 61.

Also, reference numeral 67 denotes an original abutting board that is provided in one end portion of the original base glass 61 and positions the original placed on the original base glass 61, and reference numeral 66 represents a white reference board (shading correction board) for detecting data concerning the amount of light of the LED at the center and both ends of the original, the variations of the sensitivity of a light-receiving element arranged within the CIS, and the like. This white reference board 66 is arranged on the underside of the original abutting board 67.

It should be noted here that in this embodiment, as shown in the drawing, the stand-by position of the image reading unit 68 is a position in the vicinity of the white reference board 66 that opposes the original abutting board 67, with the original base glass 61 being sandwiched therebetween.

Also, a platen roller 94 is provided on a side opposite to the one end side of the original base glass 61 on which the original abutting board 67 is provided, as shown in the drawing. Accordingly, in this embodiment, a position at which the image reading unit 68 performs the original flow reading exists on the other end side of the original base glass that is separated from the original abutting board 67 by a region in which an original placed on the original base glass 61 is read and scanned.

Figure 7:
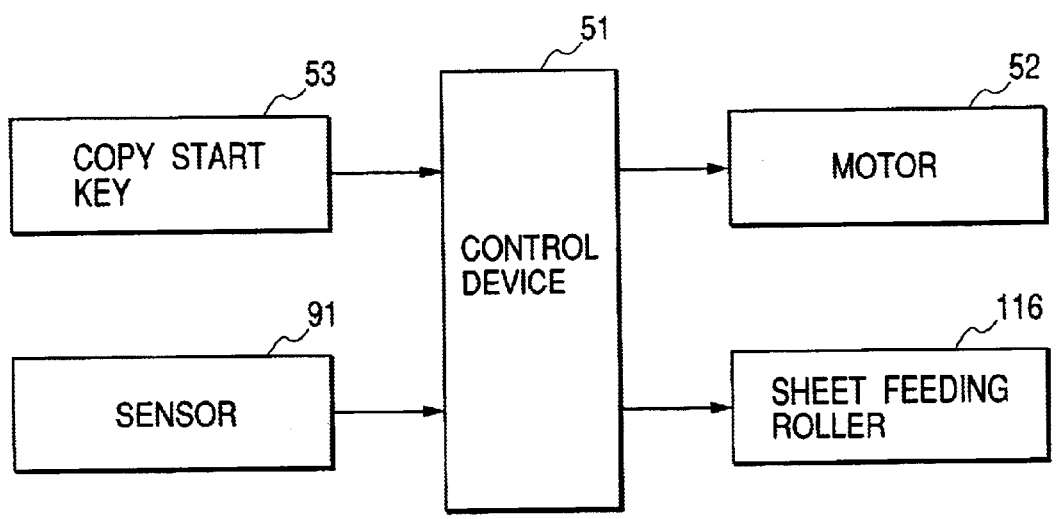
FIG. 7 is a control block diagram showing a part of a control of a digital copying machine that is an example of an image forming apparatus according to a third embodiment of the present invention.
Figure 9:
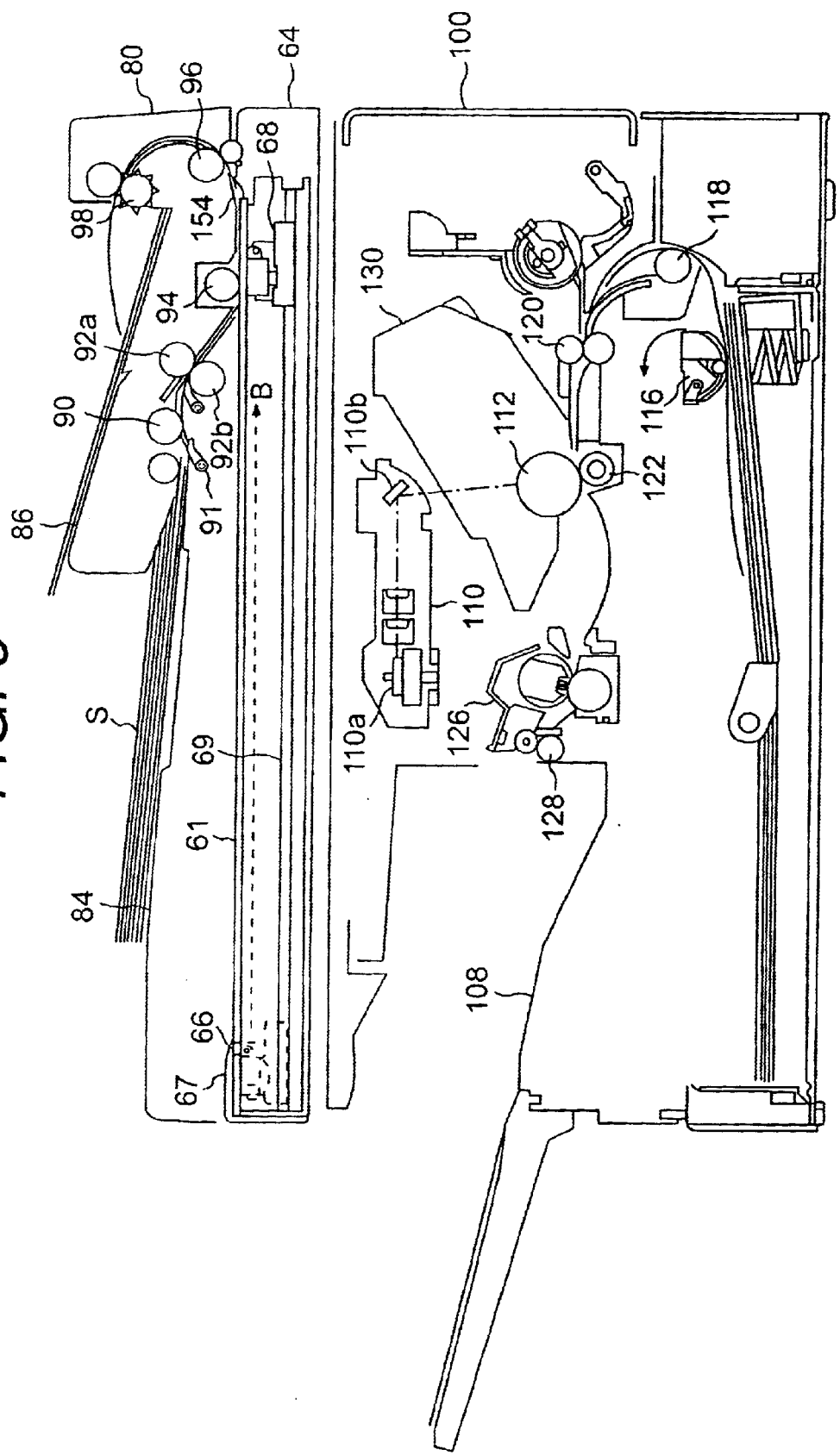
FIG. 9 illustrates an operation for performing image formation after the digital copying machine performs a flow reading operation for an original.
Figure 10:
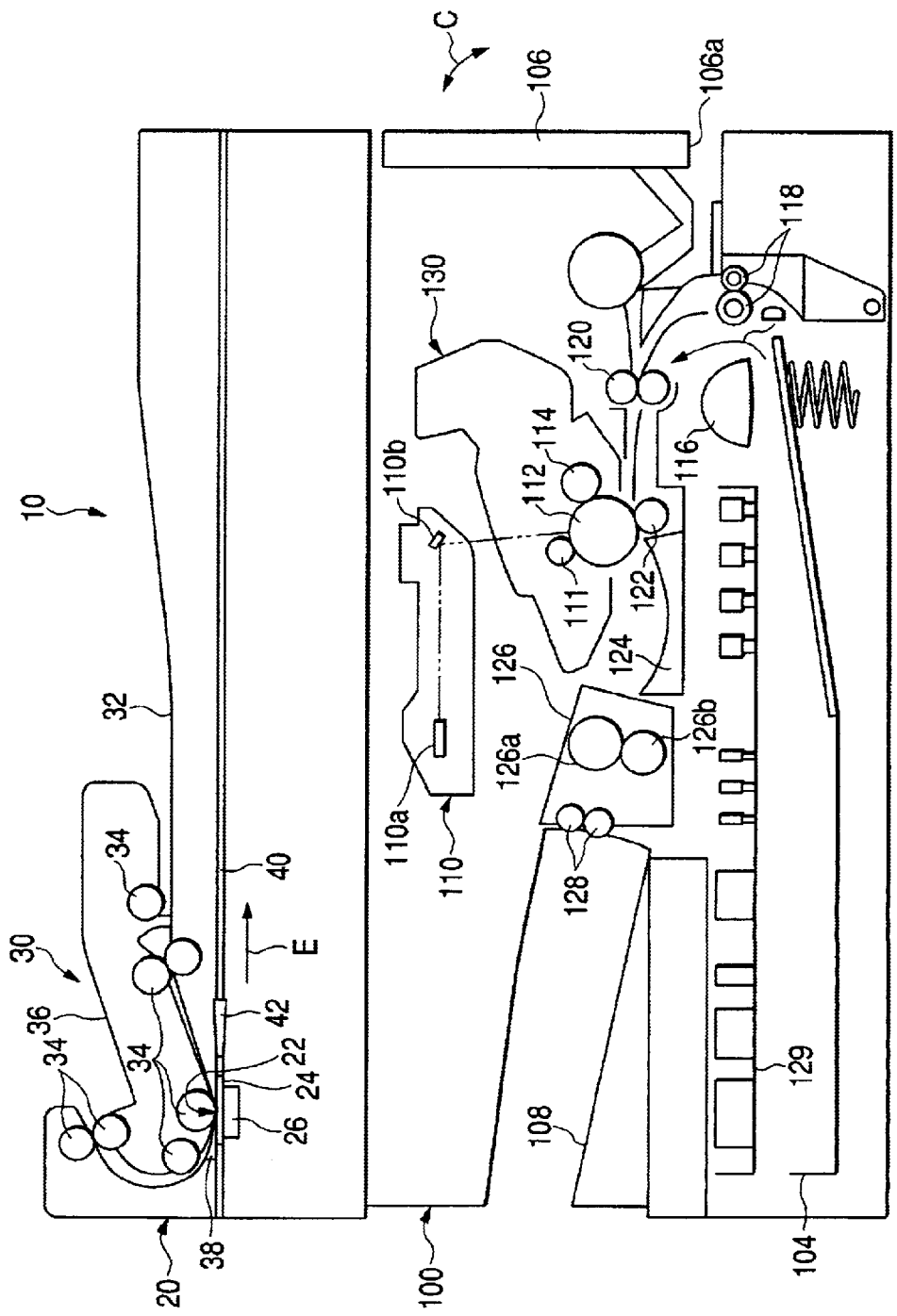
FIG. 10 is a schematic diagram showing an example of a conventional image forming apparatus.
Figure 11:
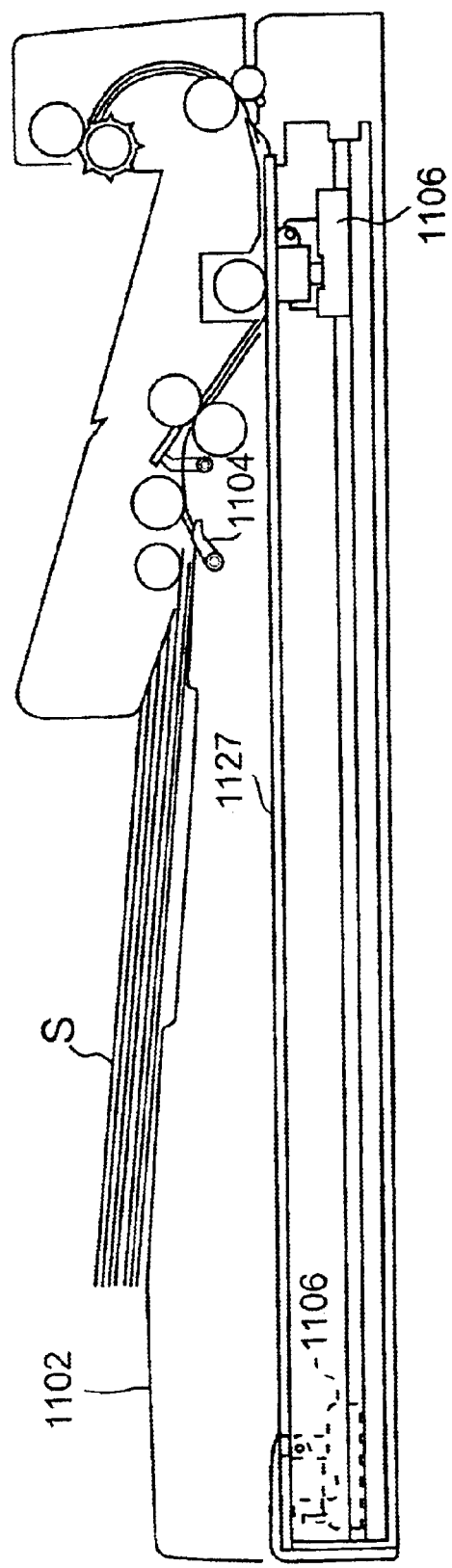
FIG. 11 shows constructions of a conventional automatic original feeding apparatus and a conventional original reading apparatus.

Also, in the digital copying machine 150 having a construction like this, in the case where an original is subjected to a flow reading operation, as shown in FIG. 9, an original S is first stacked on an original placing tray 84 so that the image surface faces down. Then, after the original S is stacked in this manner, a signal showing that an original is set on the original placing tray 84 is inputted from a sensor 91 into a control device 51 shown in FIG. 7. On the basis of this signal, the control device 51 detects that the original is set on the original placing tray 84.

On the other hand, when a copy start key 53 is operated to input an image reading operation start signal after the original S is placed on the original placing tray 84, on the basis of this signal and a detection signal from the sensor 91, the control device 51 inputs a drive signal into a motor 52 in order to move the image reading unit 68 from a stand-by position indicated by a broken line in FIG. 9 to an original flow reading position indicated by a solid line. By this operation, the image reading unit 68 moves in a direction indicated by an arrow B.

Here, in this embodiment, the original flow reading position is set on the other end side of the original base glass that is separated from the original abutting board 67 by the region in which an original placed on the original base glass 61 is read and scanned, as described above. Also, in the case where the original flow reading position is set at such a position, a distance, by which the image reading unit 68 moves to the flow reading position, is increased.

However, even in the case where the distance, by which the image reading unit 68 moves to the flow reading position, is increased like this, by moving the image reading unit 68 to the original flow reading position after a reading instruction is issued, it is possible to further increase the productivity of the digital copying machine 150 because no time is unnecessarily consumed to move the image reading unit 68.

Next, when it is detected that the image reading unit 68 reaches the original flow reading position using an unillustrated timer or sensor, the control device 51 drives a sheet feeding roller 90 so that each sheet of the original S placed on the original placing tray 84 is separately fed. Then, the original S separately fed in this manner is subjected to skew correction by a pair of registration rollers 92a and 92b, and is conveyed to a platen roller 94.

During this operation, that is, when the original S is conveyed to the platen roller 94, the image reading unit 68 has already moved to the original flow reading position that opposes the platen roller 94 with the original base glass 61 being sandwiched therebetween.

On the other hand, after passing above the image reading unit 68, the original S, whose image has been read, passes through a conveying guide base 154 and is stacked on an original discharging tray 86 through the sheet discharging roller 98. Note that after this operation, when all sheets of the original S are read and no sheet of the original S remains on the original placing tray 84, no detection signal is inputted from the sensor 91. As a result, the control device 51 judges that the reading operation is finished, and drives the motor 52 to return the image reading unit 68 to the stand-by position.

What is claimed is:

1. An image reading apparatus including an original base forming a predetermined image reading region and being adapted to receive an original placed thereon, image reading means that is disposed below said original base and reads an image of the original, and an original automatic conveying apparatus that conveys the original to said image reading region, wherein said image reading apparatus reads the image of the original by selecting one of an original fixing scanning mode and an image flow reading scanning mode, the original fixing scanning mode in which the original is placed on said original base and the image of the original is read by said image reading means performing scanning in a predetermined scanning direction below said original base, and the image flow reading scanning mode being a mode in which said image reading means is set to stay below said image reading region and the image of the original is read using said image reading means in said image reading region by conveying the original to said image reading region using said original automatic conveying apparatus, said image reading apparatus comprising:
   an abutting member which is formed in the vicinity of one end portion of said original base and against which the original placed on said original base is abutted when the original fixing scanning mode is selected; and
   a conveying guide base that is formed on another end portion of said original base opposite to said abutting member and guides the original, which is conveyed to said image reading region toward a direction of the other end portion from the one end portion by said original automatic conveying apparatus, to a predetermined original discharging tray.

2. An image reading apparatus according to claim 1, wherein said original base includes an original base glass, and at least one of said abutting member and said conveying guide base is formed integrally with an original base frame to which said original base glass is fixed.

3. An image reading apparatus according to claim 2, wherein said conveying guide base is formed integrally with said original base frame to which said original base glass is fixed, and a position, at which said original base glass is fixed, is determined by abutment of said original base glass against said original base frame when said original base glass is fixed to said original base frame.

4. An image reading apparatus according to claim 1, wherein the original is placed on said original base when the original fixing scanning mode is selected.

5. An image reading apparatus apparatus including an original base forming a predetermined image reading region is and being adapted to receive an original placed thereon, image reading means that is disposed below said original base and reads an image of the original, and an original automatic conveying apparatus that conveys the original to said image reading region, wherein said image reading apparatus reads the image of the original by selecting one of an original fixing scanning mode and an image flow reading scanning mode, the original fixing scanning mode being a mode in which the original is placed on said original base and the image of the original is read by said image reading means performing scanning in a predetermined scanning direction below said original base, and the image flow reading scanning mode being a mode in which said image reading means is set to stay below said image reading region and the image of the original is read using said image reading means in said image reading region by conveying the original to said image reading region using said original automatic conveying apparatus, said image reading apparatus comprising:

an abutting member which is formed in the vicinity of one end portion of said original base and against which the original placed on said original base is abutted when the original fixing scanning mode is selected;

a conveying guide base that is formed on another end portion side of said original base opposite to said abutting member and guides the original, which is conveyed to said image reading region toward a direction of the other end portion from the one end portion by said original automatic conveying apparatus, to a predetermined original discharging tray;

detecting means for detecting that the original is placed on original placing means included within said original automatic feeding apparatus;

image reading operation start means that is operated to start an image reading operation; and position control means for moving said image reading means from a stand-by position to a predetermined reading position before the original is fed by said original automatic feeding apparatus, wherein if a detection signal is inputted from said detecting means when said image reading operation start means is operated, said position control means moves said image reading means from said stand-by position to said predetermined reading position.

6. An image reading apparatus according to claim 5, wherein when no detection signal is inputted from said detecting means, said position control means judges that image reading is finished and moves said image reading means from said predetermined reading position to said stand-by position.

7. An image forming apparatus comprising:

an image reading apparatus that reads an image of an original; and an image forming portion that forms an image based on image information read by said image reading apparatus, wherein said image reading apparatus is an image reading apparatus according to one of claims 1 to 4, 5 and 6.

8. An image image reading apparatus according to claim 1, wherein said original automatic conveying apparatus includes an original placing tray, on which the original is placed, under said original discharging tray, and a conveying path from said original placing tray to said original discharging tray is formed into a U shape.

9. An image image reading apparatus according to claim 5, wherein said stand-by position is in a vicinity of a white reference board disposed on an underside of said abutting member.

10. An image image reading apparatus according to claim 5, wherein said predetermined reading position is disposed at the other end opposite to said abutting member separated by said image reading region.

* * * * *

UNITED STATES PATENT AND TRADEMARK OFFICE
CERTIFICATE OF CORRECTION

PATENT NO. : 6,714,757 B2
DATED : March 30, 2004
INVENTOR(S) : Yoshihide Amagai et al.

It is certified that error appears in the above-identified patent and that said Letters Patent is hereby corrected as shown below:

Column 7,
Line 45, "recoding" should read -- recording --.

Column 10,
Line 37, "of" (1st occurrence) should be deleted.

Column 15,
Line 17, "is" should be deleted.

Column 16,
Line 31, "claims 1 to 4, 5, and 6." should read -- claims 1 to 6. --.
Line 32, "image" (1st occurrence) should be deleted.
Line 34, "tray," should read -- tray --.

Signed and Sealed this

Thirtieth Day of November, 2004

JON W. DUDAS
*Director of the United States Patent and Trademark Office*